United States Patent [19]

Abel et al.

[11] 4,141,279

[45] Feb. 27, 1979

[54] METHOD AND APPARATUS FOR CUTTING CIRCUMFERENTIAL GROOVES ON THE INTERIOR OF A WORKPIECE

[75] Inventors: Eugene K. Abel, York; Jack K. Shupp, East Berlin, both of Pa.

[73] Assignee: Flinchbaugh Products, Inc., Red Lion, Pa.

[21] Appl. No.: 859,173

[22] Filed: Dec. 9, 1977

[51] Int. Cl.² .............................................. B23C 3/34
[52] U.S. Cl. ...................................... 90/11 C; 90/20; 90/DIG. 8
[58] Field of Search ........ 90/11 C, 20, 15 R, DIG. 8, 90/11.58, DIG. 5, 11.4, 11.42, 11.6, 11.62, 11 R; 82/1.2

[56] References Cited

U.S. PATENT DOCUMENTS

| 2,284,336 | 5/1942 | Morrison | 82/1.2 |
| 2,520,222 | 8/1950 | Stone | 90/11 C |
| 2,740,331 | 4/1956 | Schwartz et al. | 269/152 X |

Primary Examiner—Gil Weidenfeld

[57] ABSTRACT

A method and apparatus is disclosed for operating upon a workpiece having an internal cylindrical bore therethrough to form one or a plurality of circumferential grooves within the bore. The workpiece is held in a collet and a tool is inserted therethrough and supported for rotation at both ends. The tool has on its outer surface a row of cutting teeth for each groove to be made and has an exterior diameter including the teeth that is less than the internal diameter of the bore in the workpiece. With the tool rotated at a relatively high RPM in one direction and the workpiece rotated at a relatively low RPM in the opposite direction, the collet supporting the workpiece is moved laterally of the tool axis to contact each of the rows of cutting teeth against the internal wall of the workpiece. A single revolution of the workpiece is thus sufficient to form the entire cut. A specific arrangement of the teeth on the tool is also disclosed.

13 Claims, 6 Drawing Figures

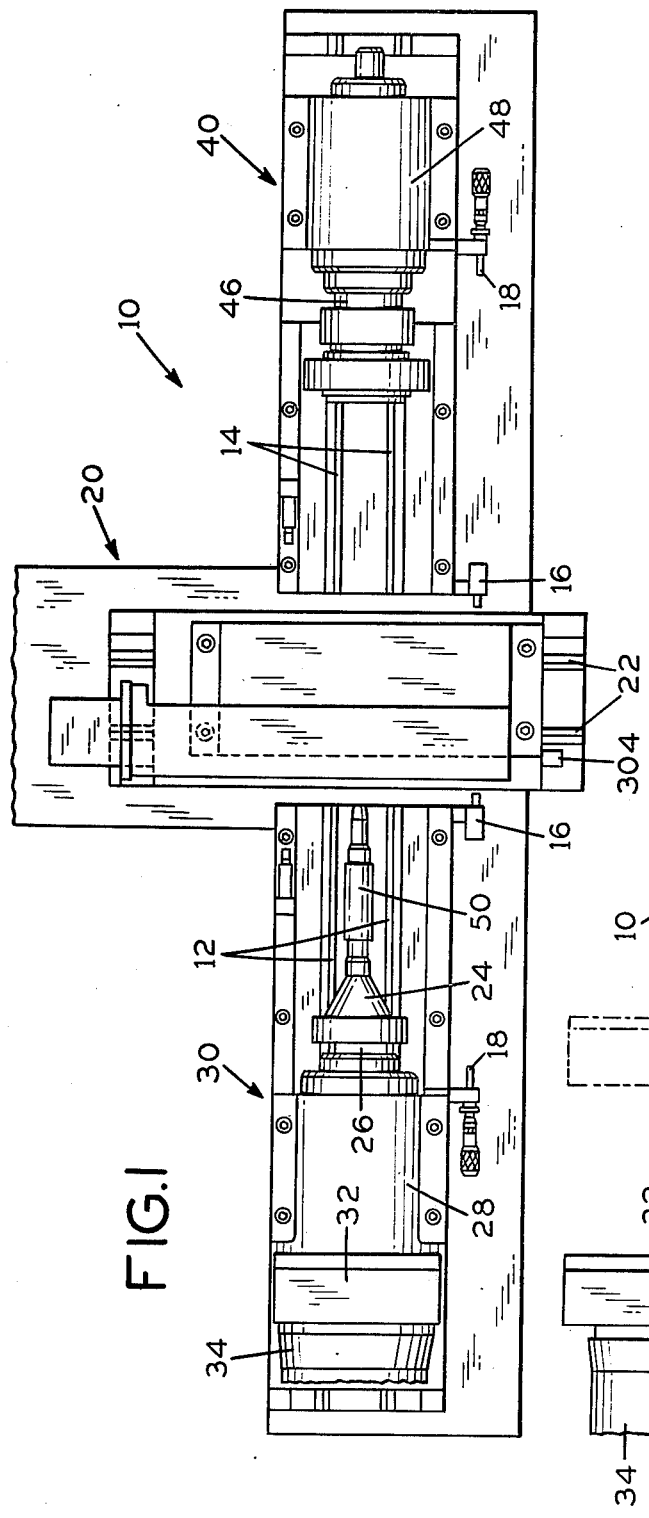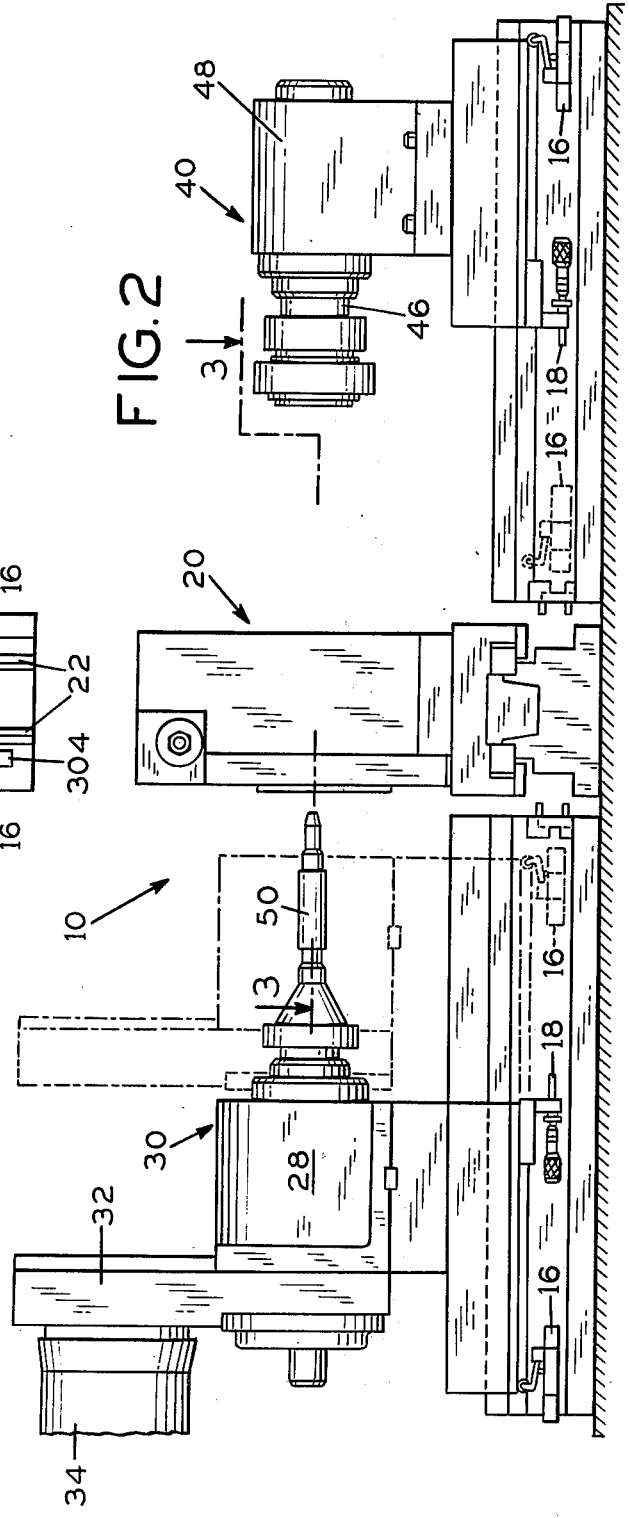

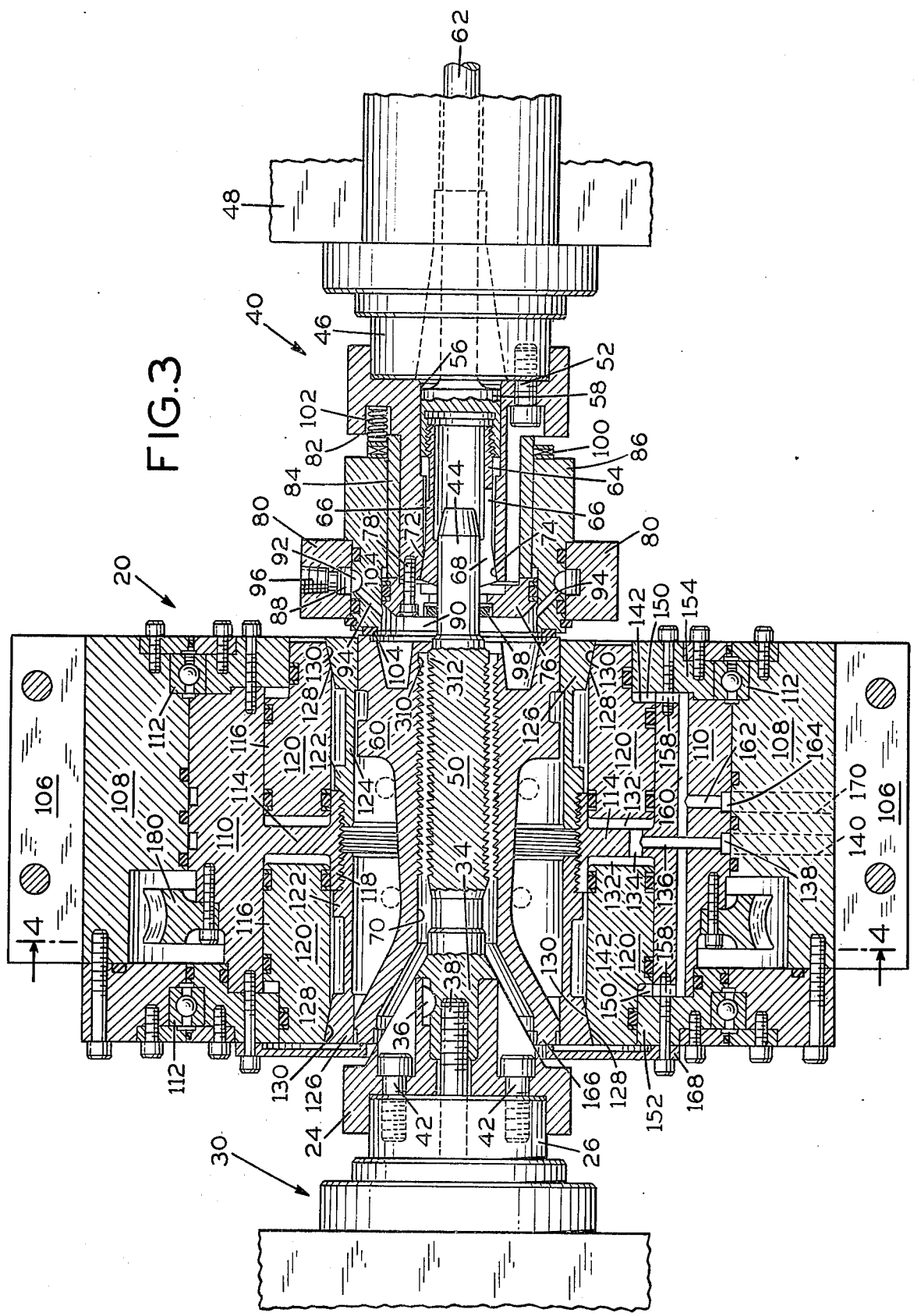

METHOD AND APPARATUS FOR CUTTING CIRCUMFERENTIAL GROOVES ON THE INTERIOR OF A WORKPIECE

BACKGROUND OF THE INVENTION

1. Field of the Invention

This invention relates to the cutting of one or more circumferential grooves or threads, principally the former, in an interior bore of a workpiece. It is particularly useful for efficiently cutting a plurality of such grooves, or partial circumferential grooves, in a thin-walled or otherwise relatively fragile workpiece, where other modes of forming the grooves might result in the application of more heat or force than the workpiece can withstand.

The cutting of one or more circumferential grooves in an interior bore of a workpiece is usually accomplished by inserting a tool into the bore and forming each groove separately, stepping the tool axially between cuts. This is time consuming and permits tolerances to build up from one cut to the next so that the overall dimensional tolerance, unless very large, is difficult to maintain.

Various forms of rotary cutters and hobs have been used to form both external and internal threads. The formation of internal threads, however, is usually limited to the end regions of the workpieces due to constraints imposed by the overall geometry of the cutter and the cutting machinery.

Groove cutting machinery for this purpose also usually generates a relatively large chip which, while it can be disposed of in the case where only one groove at a time is formed, could not readily be disposed of if all of the grooves were to be formed at the same time, particularly where the internal bore of the workpiece is narrow.

2. Description of the Prior Art

U.S. Pat. Nos. 188,405; 425,372; 1,232,099; and 3,355,752 show various forms of cutting tools for cutting internal threads in which the teeth are separated by gullets. In all of these tools the entire circumference of the cutter engages the interior surface of the workpiece at the same time. There is no teaching that these tools or modifications thereof would be useful for producing grooves, as opposed to threads, on an internal surface.

U.S. Pat. Nos. 1,137,408 and 3,353,198 show rotary cutting tools held at both ends. However, they do not show machines in which the cutter engages the interior of a workpiece along a line, as does applicant's, nor do they teach rotation of the workpiece to complete the formation of the interior grooves.

U.S. Pat. Nos. 1,427,169, 1,611,122 and 1,588,003 show thread milling machines in which the workpiece as well as the cutting tool is rotated. U.S. Pat. Nos. 1,427,169 and 1,588,003 refer to the cutting of internal threads, but the disclosed machines are limited to forming such threads only near the ends of the workpieces. U.S. Pat. No. 1,611,122 teaches a device in which one rotation of a pipe is made to complete a threading operation, however, the thread is applied to the exterior of the pipe, not the interior, and the machine would not be capable of cutting such an internal thread.

SUMMARY OF THE INVENTION

This invention is directed to a method and apparatus for forming circumferential grooves in the interior wall of a workpiece having a substantially cylindrical bore. The workpiece is mounted in a rotatable collet. A tool having a row of teeth for each groove to be cut is inserted through the workpiece and supported at both ends for rotation. The cutting tool is rotated at a relatively high RPM such as, for example, 1200 RPM in one direction and the workpiece is rotated at a relatively low RPM, for example, 10 RPM in the opposite direction. The collet which holds the workpiece is mounted for movement transversely of the axis of the cutting tool in order to bring the teeth of the cutting tool into engagement with the internal surface of the cylindrical bore along a line extending parallel to the axis of the tool. Such line is spaced from the axis of the tool a distance equal to the greatest radial distance of the teeth from the axis. The teeth are staggered in each successive row of the cutter, preferably 3° with each row, in the form of a helix, thus minimizing and distributing impacts of the tool upon the work. The shape and arrangement of the teeth thus minimizes heat and pressure on the wall of the workpiece, in that the teeth impact sequentially along the above mentioned line, in a wave, rather than all of them impacting at once. This avoids the imposition of undue side loading on the workpiece, which may therefore be relatively fragile, and also thereby improves the precision of the grooves. Means are provided to flush the space between the tool and the workpiece with fluid such as water, oil or the like, and the direction of rotation of the tool is preferably chosen to minimize dynamic resistance to the flushing fluid, thereby achieving adequate chip removal and cooling even for especially fragile work. All of the grooves may be cut in this manner with a single rotation of the workpiece, while maintaining the positional accuracy of the grooves to the same tolerance as that of the cutting tool, thereby avoiding positional inaccuracies due to a buildup of errors in the positions of the grooves.

BRIEF DESCRIPTION OF THE DRAWINGS

The invention both with respect to the method and apparatus for carrying it out will be apparent to those skilled in the art from the following detailed description and drawings in which:

FIG. 1 is a top plan view of the apparatus;

FIG. 2 is a front elevation of the apparatus;

FIG. 3 is a view taken generally along the line 3—3 of FIG. 2 but showing the tool in place and engaged in the tail stock;

DETAILED DESCRIPTION OF THE INVENTION

Figure 4:
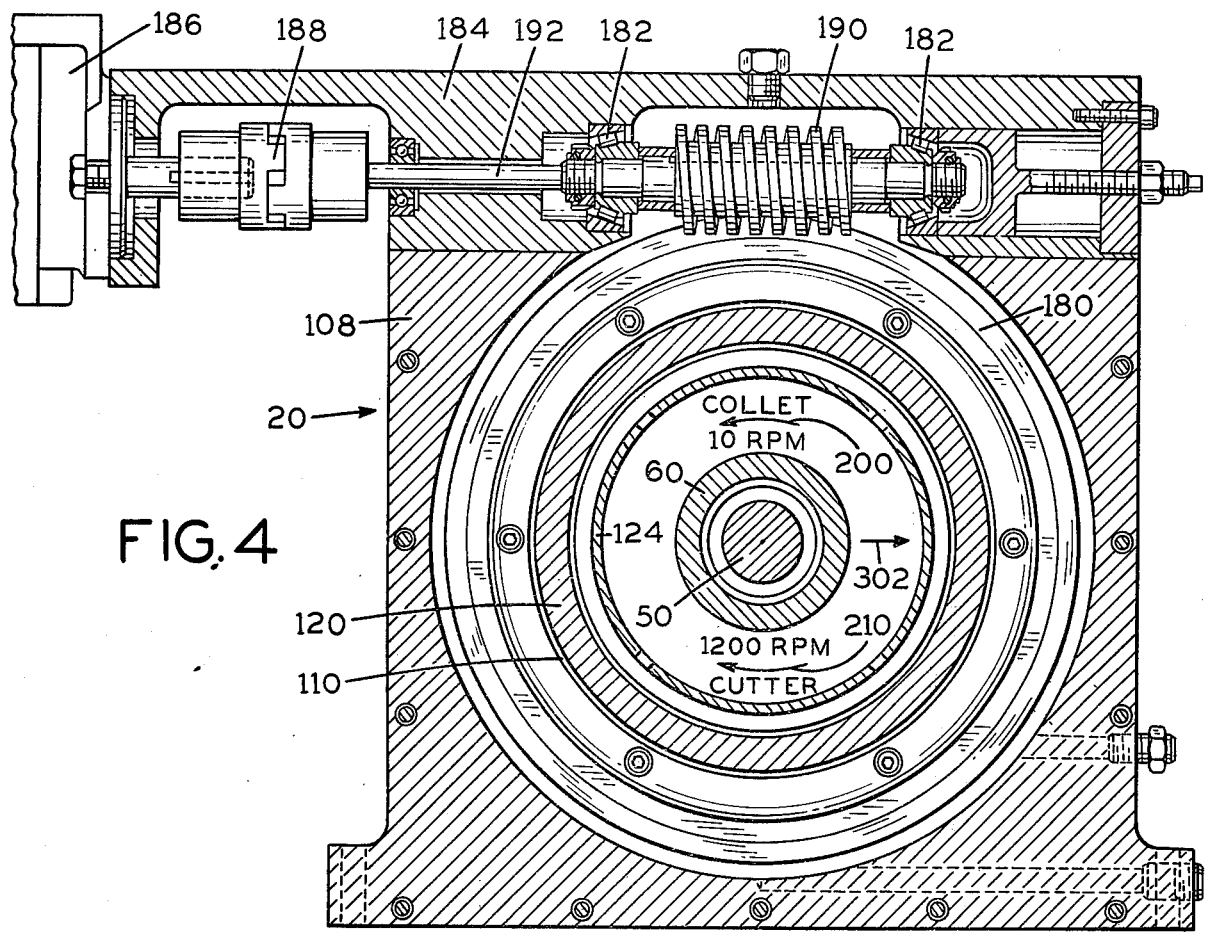
FIG. 4 is a view taken along the line 4—4 of FIG. 3.

The apparatus 10 of the invention as shown in FIG. 1 comprises a center chuck for the workpiece generally indicated at 20, a tool holding and rotating lathe-type head stock assembly 30 and a cooperating tool supporting tail stock assembly 40. The tool holding and rotating assemblies 30 and 40 are mounted upon tracks 12 and 14 respectively for movement axially therealong. Any conventional means such as rollers (not shown) may be used for mounting the assemblies 30, 40 on their respective tracks 12 and 14. Similarly, manual or power operated drive means of conventional types may be provided, similar to those used in conventional lathes, for moving the assemblies 30, 40 along the tracks 12 and 14 respectively. If, as preferred, power drives are utilized to move the assemblies 30, 40 toward and away from each other, suitable microswitches such as those indicated at 16 and 18 may be employed in known manner for controlling the inward and outward positions of the assemblies 30, 40. The length of travel of each of the assemblies 30, 40 will depend upon a number of factors including, particularly, the length of the workpiece to be supported in the chuck assembly 20. As one example, reference may be had to a particular workpiece of approximately 8" in length for which 13" travel for each of the assemblies 30, 40, has been found convenient.

The workpiece chuck 20 is mounted by any conventional means (not shown) on tracks 22 for movement therealong in a direction transverse to the longitudinal axis of the tool 50 and the chuck assemblies 30, 40. Any suitable conventional manual or powered means (not shown) may be provided for moving the workpiece chuck 20 along the tracks 22. The length of travel of the chuck workpiece 20 along the tracks 22 will be determined by a number of factors including the relative dimensional sizes of the outer diameter of the tool 50 and the internal cylindrical surface of the workpiece being operated upon as well as the depth of the grooves to be cut. In any event, the length of travel of the workpiece chuck 20 along tracks 22 need not be great and a 1" travel has been found satisfactory for a number of applications. Head stock assembly 30 includes a conventional lathe-type chuck 24 for securing the tool 50 therein. The chuck 24 is fixed to a shaft 26 mounted in suitable bearings (not shown) in the housing 28 of the tool chuck assembly 30. The shaft 28 is rotated by a chain, belt, gear or like drive mechanism mounted within housing 32, which in turn is driven by a conventional prime mover 34.

Having reference now to FIG. 3 the tool 50 is shown in place within a bore 70 extending through a workpiece 60. One end 34 of the tool 50 is shown mounted within the chuck 24 in a conventional manner including a key and keyway 36 between the tool 50 and the chuck 24 and a threaded shaft 38 threaded into a tapped mating hole in the end 34 of the tool 50. Bolts 42 mount the chuck 24 to the shaft 26.

The other end 44 of the tool 50 extends beyond the workpiece 60 and into the tail stock assembly 40 for support thereby. The tail stock assembly 40 includes a shaft 46 mounted for rotation in suitable bearings in housing 48. Secured to one end of shaft 46 by bolts 52 is a generally cylindrical chuck body 54 having a bore 56 therethrough. Mounted within the bore 56 is an internally threaded collect support 58. The collet support 58 is mounted for rotation with the chuck body member 54 and is movable axially with respect thereto.

A draw rod 62 extends from the collet support 58 through and concentric with the shaft or sleeve 46. The draw rod 62 may be manually or mechanically operated axially of the tail stock assembly 40 and the tool 50 (left and right as shown in FIG. 3) in order to effect tight gripping of and release of the end 44 of tool 50. As shown in FIG. 3, the draw rod 62 has been moved to the right thus moving collet support 58 to the right. Threaded into the internal threads of collet support 58 is a collet member 64. The collet 64 is of a conventional type having a plurality (usually four) of fingers 66 extending longitudinally parallel to the axis of the chuck 40 and terminating in pads 68 each having a tapered outer surface 72 cooperating with a mating taper 74 on the interior surface of the chuck body 54 as will be apparent.

By moving the draw rod 62 to the left tapered faces 72 and 74 cooperate to release the end 44 of the tool 50. Similarly by moving the draw rod 62 to the right the tapered faces 72 and 74 cooperate to tightly grip the tool 44 in known manner.

A cap 76 is secured to the chuck body 54 by bolts 78 or the like. Between the cap 76 and the shoulder 82 on the chuck body 54 is a bronze bushing or bearing 84. A sealing collar 86 rotatably engages the bearing 84 and is fixed (by means not shown) to be non-rotatable about the axis of the tail stock 40 but to move longitudinally along the bearing 84. That is to say, the bearing 84 supports the sealing collar 86 and rotates within the same together with the chuck body 54, collet holder 58 and collet 64.

Fixed about the sealing collar 86 is a sealing sleeve 80. Annular channel 88 on the inner surface of the sealing sleeve 80 and a cooperating annular groove 92 on the outer surface of the sealing collar 86 provide together an annular chamber communicating with the space 90 defined by the cap 76 and the inner surface of the sealing collar 86 through a plurality of conduits 94. High pressure coolant is provided to the annular chamber 88, 92 through an inlet 96 connected to means (not shown) for supplying such high pressure coolant to the chamber 88, 92 such as a reservoir and a pump. Suitable seals at the points indicated are provided to prevent leakage of such high pressure coolant including a seal 98 in the cap 76 which bears against the outer surface of the end 44 of the tool 50.

While the sealing collar 86 and the sealing sleeve 80 do not rotate with the collet 54, 64 they are permitted to move axially a short distance on the bearing 84. The sealing collar 86 has between it and the shoulder 82 a slip ring 100 urged by a plurality of springs 102 away from the shoulder 82. On the inner surface of the sealing collar 86 is a shoulder 104 that engages the inner surface of the cap 76, thus limiting the outward movement of the sealing collar 86 under the urging of the springs 102. This slight longitudinal movement of the sealing collar 86 and the sealing sleeve 80 permits automatic minute adjustment when the tail stock 40 moves into the position shown in FIG. 3 and comes up against its stop (not shown) which may be fixed or, a alternatively microswitch for controlling a drive mechanism, or some combination of the two. When tail stock 40 moves into the position shown in FIG. 3 it brings a seal 104 up against one end of the workpiece 60 to seal off the space 90 from the outside. The springs 102 give sufficiently to insure proper closing of the space 90 as described above, while at the same time minimizing friction between the seal 104 and workpiece 60. The seal 104 can be of any suitable material such as plastic or hard rubber suitable for the purpose, taking into account the fact that the workpiece will rotate at a relatively slow speed of, say, 10 RPM while the seal 104 remains stationary.

The workpiece chuck 20 comprises a base 106 mounted upon rails 22 as explained above. On the base 106 is fixed a housing 108 within which there is journalled on bearings 112 a rotatable generally cylindrical collet holder 110. An inwardly extending annular web 114 integral with holder 110 separates two annular cylinders 116 in holder 110, within which there are positioned annular pistons 120. Integral with web 114 is an inner threaded smaller cylinder 118 within which are threaded two collets 122, one from the left and one from the right as viewed in the figure. Each collet 122 has outwardly extending fingers 124 (four fingers for each collet presently being preferred) on the ends of which are gripping pads 126 having outwardly tapered surfaces 128 cooperating with mating tapered surfaces 130 on the annular pistons 120. Between the inner face of pistons 120 and web 114 are annular chambers 132, both of which communicate with conduit 134 and, through it, with conduit 136 which in turn communicates with annular chamber 138 about the periphery of collet holder 110. A conduit 140 through fixed housing 108 communicates with annular chamber 138.

The annular pistons 120 also have an outwardly facing annular shoulder 142 which in part defines an annular chamber 150 for each piston 120. The opposite face of the chamber 150 is defined either by the cover plate 152 (for the chamber 150 on the left in FIG. 3) or by the cover plate 154 (for the chamber 150 to the right in FIG. 3) which cover plates are of slightly different configuration as shown. Each chamber 150 communicates through conduit 158 with conduit 160, in turn communicating with conduit 162 which communicates with annular chamber 164 in the outer surface of collet holding and rotating member 110. Chamber 164 communicates with conduit 170 extending through the fixed housing 108.

Suitable hydraulic mechanism including conventional pumps, valves and the like is connected to conduits 140 and 170 to control the inward and outward movement of annular pistons 120. To release the workpiece 60 from collets 122, hydraulic pressure is supplied to the conduit 170 and thus to annular chamber 164, which in turn pressurizes conduits 162, 160 and 158 thereby pressurizing chambers 150. At the same time, release is provided by the hydraulic mechanism with respect to the conduit 140, permitting the hydraulic fluid in chamber 132 to flow outwardly through conduits 134, 136 to chamber 138 and outwardly through conduit 140 to a reservoir or other mechanism.

This movement of annular pistons 120 inwardly toward the web 114 causes mating tapered surfaces 128 and 130 to release the pressure on collet pads 126, thus releasing the pressure of pads 126 against workpiece 60. The tail stock 40 and the tool chuck 30 will already have moved outwardly away from the workpiece, which may then be withdrawn from workpiece holding and rotating collet 20 by removing the same toward the right in FIG. 3. The next workpiece 60 is then inserted, and its end 166 comes up against stop and cover plate 168 bolted to end plate 152. This abutment of end 166 with plate 168 serves to accurately position the workpiece along the longitudinal axis of the apparatus.

The hydraulic mechanism then is operated either manually or automatically to pressurize conduit 140 and annular chamber 138. Conduits 136 and 134 are pressurized from the annular chamber 138 and the piston chambers 132 become pressurized from conduit 134, causing annular pistons 120 to move outwardly away from web 114. At the same time, pressure is released in conduit 170 permitting chambers 150 at the opposite end of annular pistons 120 to empty their hydraulic fluid through conduits 158, 160, 162 and annular chamber 164, through conduit 170 and back to a part of the hydraulic mechanism such as a reservoir. This outward movement of pistons 120 causes their surfaces 130 to slide along mating tapered surfaces 128 of collets 122 on pads 126 thereof, thus causing the pads 126 to bear tightly against the outer periphery of the workpiece.

Rotatable collet holder 110 has bolted to its outer periphery a gear 180 shaped to conform to and cooperate with a worm gear 190 (see FIG. 4) mounted in bearings 182 in a subhousing 184 mounted on top of housing 108. An electric motor or other prime mover 186 drives shaft 192 through coupling 188 to rotate worm gear 190 and gear 180. This rotation of gear 180 rotates collet holder 110 in the direction of arrow 200, which is in the opposite direction from the rotation of cutter tool 50 (arrow 210).

Figure 5:
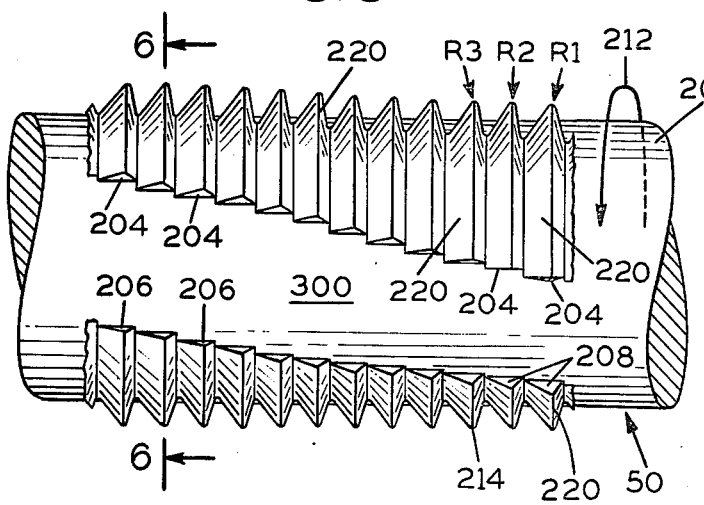
FIG. 5 is an enlarged detailed view of a portion of the tool.
Figure 6:
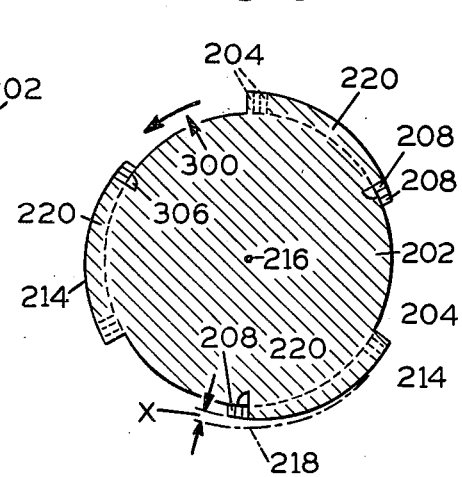
FIG. 6 is a cross-section taken along the line 6—6 of FIG. 5.

FIG. 5 shows a segment of the tool 50 for cutting the grooves and FIG. 6 shows a cross-section thereof. As shown in FIG. 5, the tool or cutter rotates in the direction of arrow 212. The tool comprises a shaft 202 having a plurality of teeth 220 thereon. As shown in FIG. 6 there are three teeth 220 arranged in a common plane around the shaft 202. The plane of the teeth is transverse to the axis of the shaft 202. As such, each of the three teeth 220 in a common transverse plane comprise a "row" of teeth (as the term "row" used herein).

Each successive row of teeth is slightly angularly offset with respect to both the preceding and the succeeding rows. The leading edges of teeth 220 are indicated at 204 and the trailing edges at 206. As shown in FIG. 5, in the row of teeth R1 the leading edge 204 is slightly ahead of the leading edge 204 of the adjacent tooth in row R2. The next tooth 220 in row R3 has its leading edge 204 slightly behind the leading edge of the adjacent tooth in row R2. This arrangement continues throughout the tool for an axial distance over which circumferential grooves are to be cut in the workpiece. This arrangement is also true of all the teeth in a row. That is to say, all of the teeth 220 in row R1 (three as shown in FIG. 6) have their leading edges slightly ahead of the corresponding adjacent teeth 220 in row R2 and all of the leading edges 204 in row R2 are slightly ahead of the corresponding adjacent teeth in row R3, and so on for each row. Since all teeth 220 are of the same arcuate length, the trailing edges 208 are comparably staggered. In FIG. 6 four rows of teeth 220 are partially shown in that the trailing edges thereof are shown and the leading edges of three are shown in dotted lines.

As also shown in FIG. 6, the outer peak 214 of each tooth 220 is closer to the axis 216 of the shaft 202 at the trailing edge 208 of the tooth than at its leading edge 204. The curved line 218 is a circle drawn about the axis 216 which coincides with the distance of the peak 214 from the axis 216 at the leading edge 204 of tooth 220 for all such teeth 220. The distance "X" is the radial distance of the peak 214 from the circle 218 at the trailing edge 208 of each tooth 220. Accordingly, the outer peak 214 of the teeth 220 may be said to curve inwardly toward the trailing edge of the teeth. The value of "X" may vary depending upon a number of factors. One tool which has been found satisfactory has a value of 0.03" for "X." The particular shape of the teeth in cross-section is shown to be substantially triangular; the specific dimensions and indeed the shape itself will depend upon the shape and dimensions of the grooves desired in the final workpiece 60. Additionally, while three teeth per row are shown, those skilled in the art will understand that there may be more or fewer teeth per row depending upon a variety of factors including the size of the groove desired, the material of the workpiece 60 and the like. As shown, the teeth 220 each comprises an arc of 60° with a 60° space between the trailing edge of each tooth in a row and the leading edge of the next succeeding tooth in the row. This is true of all rows. The particular angle occupied by each tooth and the space between teeth will be dependent upon the number of teeth in the row, as will be apparent. The space between the trailing edge of each tooth and the leading edge of the succeeding tooth in a row is adjacent to a similar space that is slightly offset in each adjacent row. The sum total of these spaces along the tool forms a gullet 300 through which high pressure flushing fluid may flow to clean out the very fine chips produced by the tool in accordance with the invention.

OPERATION

After the workpiece 60 has been placed in workpiece chuck 20, head stock 30 and tail stock 40 are controlled to move toward each other from the position shown in FIG. 1 to that shown in FIG. 3. During this movement the tool 50 passes through workpiece 60. The end 44 of tool 50 slides through gasket seal 98 in tail stock 40 to the position shown in FIG. 3. Draw rod 62 is then activated to cause collet fingers 66 and their pads 68 to bear tightly against the end 44 of tool 50.

At this point the axis of cylinder 70 and the axis 216 of tool 50 coincide or very nearly coincide. Clearance exists between the outer circumference of the tool (coinciding with the outer ridges 214 at the leading edges 204 of teeth 220) and the inner surface 70 of the workpiece. Coolant flow may then be commenced as hereinafter described.

Motor 186 is then energized to rotate collet holder 110, collets 122 and the workpiece 60 in the direction of arrow 200. Similarly, drive 32 is activated to rotate cutting tool 50 (including tail stock 40) in the direction of arrow 210. The cutting tool 50 is rotated at a relatively high rate of speed, about 1200 RPM being presently preferred for the cutting of a thin walled aluminum alloy workpiece. About ten RPM is presently preferred in this case for rotation of workpiece. It will be appreciated, however, that the speeds of the cutter and workpiece may vary considerably from those presently preferred depending upon such factors as the material of the workpiece, the depth and shape of the grooves, the number of the grooves and other factors, the nature and effect of which will be apparent to those familiar with this art. The workpiece must be rotated at least once in order to achieve a complete groove around its inner circumference.

Once the workpiece and the cutter tool are rotating, the workpiece chuck 20 is moved transversely to the axis of tool 216 along tracks 22, i.e., in the direction of arrow 302 in FIG. 4. Since the axis 216 of tool 50 remains stationary, tool 50 will thereby engage the inner circumferential wall 70 of the workpiece. Initially this engagement is between only a single leading edge 204 of a single tooth 220 in a single row, due to the offset arrangement above described with respect to FIGS. 5 and 6. This initial contact is quickly followed by contact with the adjacent tooth in the next row, followed by contact with the adjacent tooth in the subsequent row and so on. By this means, the tool exerts only minimal pressure on the workpiece at any given movement.

Each successive tooth in the same row chips its respective groove slightly deeper until the full desired depth is achieved, at which time the movement of the workpiece chuck 20 in the direction of the arrow 302 is stopped by virtue of the workpiece chuck 20 coming up against a stop, such as stop 304 shown in FIG. 1 adjacent one of the tracks 22. Such stop may be a mechanical stop, an hydraulic or electrical stop or some combination thereof. The number of rotations that the workpiece must make in order to complete a groove will depend upon a number of factors including particularly the rate of feed of the workpiece in the direction of arrow 302, the depth of the groove, how big a "bite" each tooth takes (which in turn depends upon other parameters such as the material being worked upon) and the like. As mentioned, at least one rotation of the workpiece is necessary in order to complete a groove around the entire inner circumference of the cylinder although for some applications it may be desired to have a larger number of rotations in order to produce exceedingly fine chips. It will also be understood by those skilled in the art that it is possible to provide one or more grooves in a workpiece which extend less than the full distance around the circumference of the inner cylinder. That is, one or more grooves in an arc of less than 360° may be provided on the inner cylindrical wall simply by rotating the workpiece only through such a limited arc.

During operation, high pressure coolant is supplied through a fitting threaded into the tapped opening 96 whereby the coolant fills annular chamber 88, 92 passes through conduits 94 into space 90 and from the space 90 into the space between the tool 50 and workpiece 60 in those areas of the tool spaced from the walls 70 as well as along gullets 300. The tool as shown forms very fine chips which are readily removed by the coolant, particularly along gullets 300. A slight relief 306 at the trailing edge of each tooth is part of the gullet 300 and aids in removing these fine chips. Note that the rotational direction of the tool is such that the hilical path formed by its gullet effectively threads into, rather than out of, the path of the incoming coolant flow, thereby creating minimum dynamic resistance to the flow and significantly enhancing the degree of cooling and chip removal achieved. Upon completion of the cutting operation, motor 186 and drive 32 are de-energized, thus stopping rotation of the collet and workpiece 60 as well as stopping rotation of tool 50. Workpiece holder 20 is then retracted in the direction opposite arrow 302 until the axis of the workpiece substantially coincides with the axis of tool 50. The high pressure coolant is then shut off. Draw rod 62 is moved to the left as shown in FIG. 3 to release the end 44 of tool 50, and chuck 30 and tail stock 40 are moved outwardly away from workpiece holder 20 thus withdrawing the tool from the internal bore 70 of the workpiece.

By suitably shaping the teeth 220 a great variety of groove shapes may be achieved and all the grooves cut by the tool need not necessarily be of the same shape. For example, in the workpiece 60 shown it was desired to provide a counterbore 310 at one end of cylinder wall 70 (the right hand end as viewed in FIG. 3). For this purpose tool 50 may be provided with a plurality (e.g., three) of teeth 312 shaped to provide the desired counter bore 310. It will be appreciated that this merely constitutes a longer groove, i.e., a groove longer in the direction of the longitudinal axis of the tool, but since such groove is located at the end of the workpiece it constitutes a counter bore. Such a groove may alternatively be provided at any desired position in the cylindrical wall 70.

It will also be appreciated by those skilled in the art that by suitably shaping and sizing the teeth and arranging them at an angle to the axis of rotation and by moving the tool 50 longitudinally of its axis during the cutting operation, a thread rather than discrete grooves may be formed on the inner surface of the cylinder 70. As such the term groove as used herein if not otherwise specified is intended to encompass the broadest possible definition for a groove including a counter-bore and a thread.

We claim:

1. The method of forming at least one groove in a hollow workpiece having a circular inner wall, comprising inserting into the workpiece, an elongated cutting tool having a cutter portion intermediate the ends thereof, said cutter portion having a maximum diameter less than the inside diameter of the workpiece, supporting both ends of said cutting tool and supporting the workpiece for rotation about their respective axes, rotating said tool in one direction and the workpiece in the opposite direction so as to provide relative rotational movement between them; and effecting relative movement between said tool and the workpiece in a direction transverse to the axis of the tool to engage the cutting portion with said inner wall and to cut the groove therein.

2. The method of claim 1 including continuing said relative movement until the groove is cut to the desired depth.

3. The method of claim 2 in which said workpiece is rotated at least once through 360° in order to provide a groove around the entire periphery of such inner wall.

4. The method of claim 3 in which the groove is formed in a plane substantially transverse to the rotational axis of the workpiece.

5. The method of claim 4 in which the groove is formed as counter-bore.

6. The method of claim 1 in which said tool is rotated at a greater number of revolutions per minute than said workpiece.

7. The method of claim 6 including flushing the space between the cutting portion and the inner wall with a coolant.

8. The method of claim 7 wherein the cutting portion is provided with a plurality of teeth arranged in rows, the teeth of each row being staggered relative to the teeth of succeeding rows such that a helical gullet is formed between the successive rows, the rotational direction of the tool being such that the helical gullet threads into the path of the oncoming coolant to provide minimum dynamic resistance to the coolant flow.

9. Apparatus for cutting a groove in an inner wall of a workpiece, which workpiece has a substantially cylindrical bore therethrough, comprising means for supporting and rotating a workpiece in a first direction, an elongated cutting tool having a cutting portion intermediate the ends thereof, said cutting portion having a maximum diameter less than that of said bore, means for supporting said cutting tool at each end thereof with said tool extending through such bore, means for rotating said tool in a direction opposite said first direction, and means for effecting relative movement between said tool and the workpiece in a direction substantially transverse to the longitudinal axis of the tool to engage the cutting portion with said inner wall and to cut the groove therein.

10. The apparatus of claim 9 in which said cutting portion has a plurality of teeth arranged in a row on the circumference thereof.

11. The apparatus of claim 10 in which said row is positioned in a plane substantially transverse to the longitudinal axis of said tool.

12. The apparatus of claim 11 in which there are a plurality of said rows of teeth and in which the teeth of each row are offset circumferentially from the teeth of an adjacent row.

13. The apparatus of claim 12 in which each row of teeth is offset in the same direction with respect to the preceding row of teeth.

* * * * *

UNITED STATES PATENT AND TRADEMARK OFFICE
CERTIFICATE OF CORRECTION

PATENT NO. : 4,141,279

DATED : February 27, 1979

INVENTOR(S) : Eugene K. Abel and Jack S. Shupp

It is certified that error appears in the above-identified patent and that said Letters Patent are hereby corrected as shown below:

Column 3, line 52, for "collect" substitute --collet--.
Column 6, line 20, insert --is-- before "used".
Column 9, line 31, for "such" substitute --said--;
 line 37, insert --a-- before "counter-bore".

Signed and Sealed this

Eighteenth Day of September 1979

[SEAL]

Attest:

LUTRELLE F. PARKER

*Attesting Officer*   *Acting Commissioner of Patents and Trademarks*